US 9,077,562 B2

(12) United States Patent
Rajagopalan et al.

(10) Patent No.: US 9,077,562 B2
(45) Date of Patent: Jul. 7, 2015

(54) SYSTEM AND METHOD FOR LAYER-2 MULTICAST MULTIPATHING

(75) Inventors: Santosh Rajagopalan, San Jose, CA (US); Sanjay Sane, Fremont, CA (US); Leonard T. Tracy, Vancouver, WA (US); Ayan Banerjee, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 13/492,383

(22) Filed: Jun. 8, 2012

(65) Prior Publication Data

US 2013/0329727 A1 Dec. 12, 2013

(51) Int. Cl.
*H04L 12/56* (2006.01)
*H04L 12/46* (2006.01)
*H04L 12/743* (2013.01)
*H04L 12/751* (2013.01)
*H04L 12/761* (2013.01)

(52) U.S. Cl.
CPC ........ *H04L 12/4641* (2013.01); *H04L 45/7453* (2013.01); *H04L 45/02* (2013.01); *H04L 45/16* (2013.01)

(58) Field of Classification Search
None
See application file for complete search history.

(56) References Cited

U.S. PATENT DOCUMENTS

| 5,903,559 | A | 5/1999 | Acharya et al. |
| 6,002,689 | A | 12/1999 | Christie et al. |
| 6,047,331 | A | 4/2000 | Medard et al. |
| 6,266,705 | B1 | 7/2001 | Ullum |
| 6,728,205 | B1 | 4/2004 | Finn et al. |
| 6,934,292 | B1 | 8/2005 | Ammitzboell |
| 7,002,955 | B1 | 2/2006 | Kanuri et al. |
| 7,203,187 | B1 | 4/2007 | Richardson et al. |
| 7,266,635 | B1 | 9/2007 | Medina |
| 7,346,025 | B2 | 3/2008 | Bryson |
| 7,512,226 | B1 | 3/2009 | Yoakum et al. |
| 7,760,668 | B1 | 7/2010 | Zinjuvadia |
| 7,760,735 | B1 | 7/2010 | Chen et al. |
| 7,876,706 | B2 | 1/2011 | Ekl et al. |
| 7,924,702 | B2 | 4/2011 | Kulkarni et al. |
| 7,940,661 | B2 | 5/2011 | Ervin et al. |
| 8,069,304 | B2 | 11/2011 | Panchalingam et al. |
| 8,514,746 | B1 | 8/2013 | Goli et al. |
| 8,594,085 | B2 | 11/2013 | Zuk et al. |
| 8,605,727 | B1 * | 12/2013 | Bishara .......... 370/392 |
| 8,792,374 | B1 | 7/2014 | Jain et al. |

(Continued)

FOREIGN PATENT DOCUMENTS

| EP | 0361649 A2 | 7/1999 |
| WO | WO2013/184236 | 12/2013 |

OTHER PUBLICATIONS

USPTO Feb. 26, 2014 Final Office Action from U.S. Appl. No. 13/453,576.

(Continued)

*Primary Examiner* — Kouroush Mohebbi
(74) *Attorney, Agent, or Firm* — Patent Capital Group

(57) ABSTRACT

An example method is provided and includes a multicast data message from a data source, the message in a first virtual local area network and being associated with a multicast group. The method also includes calculating a hash value based on the virtual local area network, the data source, and the multicast group, determining a port for a designated router in a Layer-2 network based on the hash value, and switching the multicast data message to the port that was determined.

19 Claims, 4 Drawing Sheets

(56) References Cited

U.S. PATENT DOCUMENTS

| | | |
|---|---|---|
| 2003/0041150 A1 | 2/2003 | Passman et al. |
| 2003/0189942 A1 | 10/2003 | Sawey |
| 2004/0105440 A1 | 6/2004 | Strachan et al. |
| 2004/0114570 A1 | 6/2004 | Vikberg et al. |
| 2005/0129017 A1* | 6/2005 | Guingo et al. ............... 370/390 |
| 2005/0190704 A1 | 9/2005 | Zhang et al. |
| 2005/0210508 A1 | 9/2005 | Lau et al. |
| 2006/0045068 A1 | 3/2006 | Wu et al. |
| 2007/0140131 A1 | 6/2007 | Malloy et al. |
| 2007/0245034 A1 | 10/2007 | Retana et al. |
| 2007/0291733 A1 | 12/2007 | Doran et al. |
| 2008/0025309 A1 | 1/2008 | Swallow |
| 2008/0240112 A1 | 10/2008 | Muqattash et al. |
| 2008/0270421 A1 | 10/2008 | Ushiyama |
| 2009/0168768 A1 | 7/2009 | Chiabaut et al. |
| 2010/0034100 A1 | 2/2010 | Beyers et al. |
| 2010/0061269 A1 | 3/2010 | Banerjee et al. |
| 2011/0032936 A1 | 2/2011 | Ashwood-Smith et al. |
| 2011/0063979 A1 | 3/2011 | Matthews et al. |
| 2011/0267947 A1 | 11/2011 | Dhar et al. |
| 2012/0027017 A1 | 2/2012 | Rai et al. |
| 2012/0131216 A1 | 5/2012 | Jain et al. |
| 2012/0300782 A1 | 11/2012 | Farinacci et al. |
| 2013/0044757 A1 | 2/2013 | Rai et al. |
| 2013/0071116 A1 | 3/2013 | Ong |
| 2013/0094357 A1 | 4/2013 | Sankar et al. |

OTHER PUBLICATIONS

USPTO Dec. 23, 2013 Non-Final Office Action from U.S. Appl. No. 13/551,350.

"Load Sharing with HSRP," Cisco Systems, Inc., Aug. 10, 2005, 3 pages www.cisco.com/en/US/tech/tk648/tk362/technologies_configuration_example09186a0080094e90.shtml.

U.S. Appl. No. 13/551,350, filed Jul. 17, 2012, entitled "System and Method for Layer-2 Network Routing," Inventor(s): Chandan Mishra, et al.

U.S. Appl. No. 13/453,576, filed Apr. 23, 2012, entitled "System and Method for Selecting a Root Node in a Network Environment," Inventors: Ayan Banerjee, et al.

USPTO Jun. 8, 2012 Non-Final Office Action from U.S. Appl. No. 12/771,853.

USPTO Sep. 7, 2012 Response to Non-Final Office Action dated Jun. 8, 2012 from U.S. Appl. No. 12/771,853.

USPTO Nov. 16, 2012 Non-Final Office Action from U.S. Appl. No. 12/771,853.

USPTO Feb. 9, 2013 Response to Non-Final Office Action dated Nov. 16, 2012 from U.S. Appl. No. 12/771,853.

USPTO Apr. 18, 2013 Non-Final Office Action from U.S. Appl. No. 12/771,853.

USPTO Jul. 17, 2013 Response to Non-Final Office Action dated Apr. 18, 2013 from U.S. Appl. No. 12/771,853.

USPTO Aug. 16, 2013 Notice of Allowance from U.S. Appl. No. 12/771,853.

USPTO Oct. 8, 2013 Non-Final Office Action from U.S. Appl. No. 13/453,576.

PCT Dec. 9, 2013 International Search Report and Written Opinion of the International Searching Authority from International Application No. PCT/US2013/036423.

USPTO Jan. 27, 2015 Non-Final Office Action from U.S. Appl. No. 13/453,576.

USPTO Aug. 1, 2014 Final Office Action from U.S. Appl. No. 13/551,350.

USPTO Aug. 1, 2014 Non-Final Office Action from U.S. Appl. No. 13/551,350.

* cited by examiner

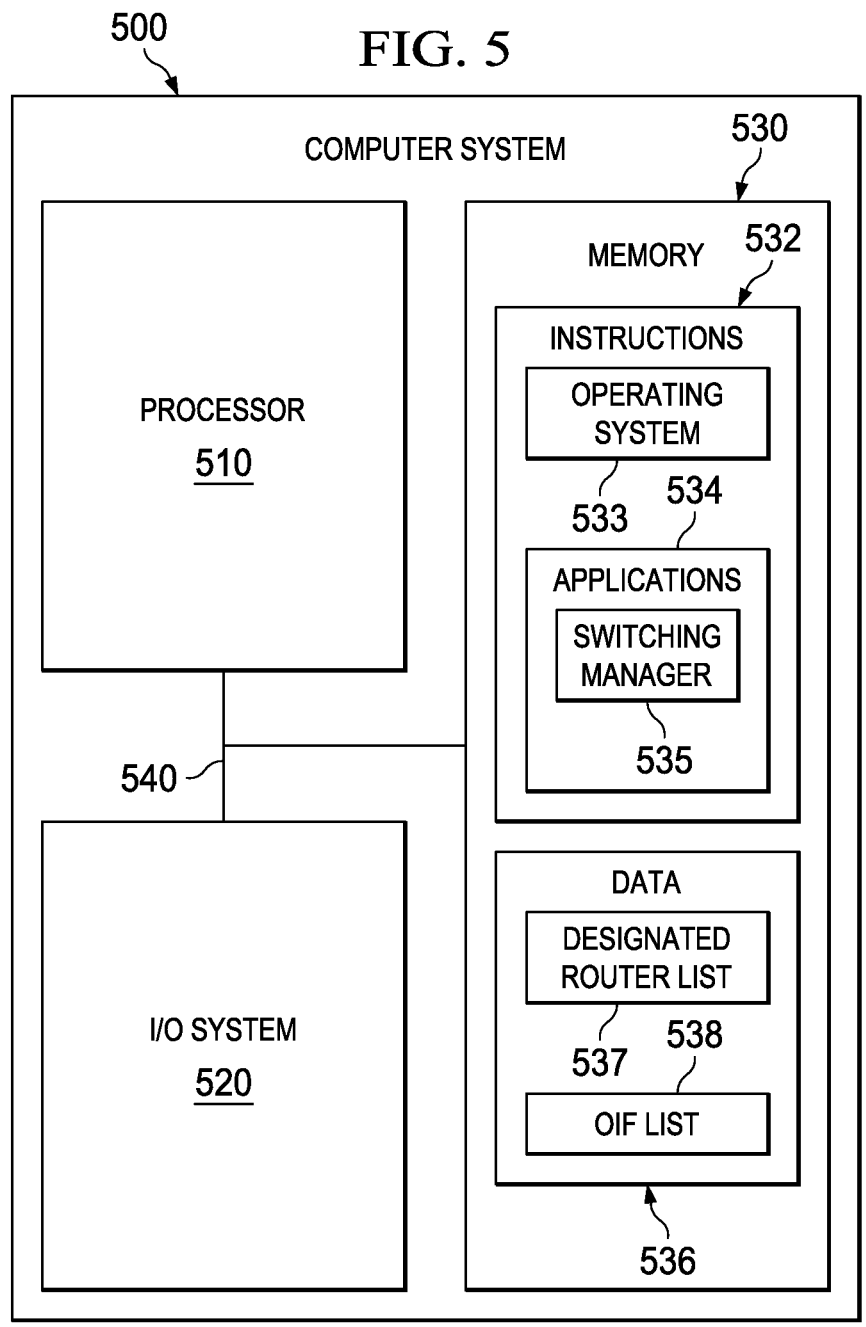

SYSTEM AND METHOD FOR LAYER-2 MULTICAST MULTIPATHING

TECHNICAL FIELD

This disclosure relates in general to the field of communications and, more particularly, to a system and a method for Layer-2 multicast multipathing.

BACKGROUND

Ethernet architectures have grown in complexity in recent years. This is due, at least in part, to diverse technologies that have emerged to accommodate a plethora of end users. For example, Data Center Ethernet (DCE) represents an extension to Classical Ethernet (CE), and it can offer a lower cost, lower latency, high-bandwidth configuration. The forwarding methodology adopted by networks is generally scalable and, further, provides forwarding paths with equal-cost multipathing with support for different forwarding topologies.

Layer-2 link state routing protocols can be used in data centers to overcome the drawbacks of the Spanning Tree Protocol (STP). Transparent Interconnect of Lots of Links (TRILL) from the IETF and Fabric Path (from Cisco Systems, Inc. of San Jose, Calif.) and are examples of such Layer-2 link state routing techniques. The link state protocols allow for better use of network resources by calculating shortest path forwarding trees to the nodes in the network. Unicast traffic can be forwarded along multiple equal cost paths if available. In certain network scenarios, topology information may not be current, accurate, and/or consistent. Hence, optimally managing network topologies presents a significant challenge to system designers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified block diagram of a network node multicast multipathing in a Layer-2 network.

DETAILED DESCRIPTION OF EXAMPLE EMBODIMENTS

Overview

A method is provided in one example embodiment and includes receiving, for example at an access switch of a Layer-2 network, a multicast data message from a data source, the message being in a first virtual local area network and being associated with a multicast group. The method also includes calculating a hash value based on the virtual local area network, the data source, and the multicast group, determining a port for a designated router in the Layer-2 network based on the hash value, and switching the multicast data message to the port that was determined.

Example Embodiments

Figure 1:
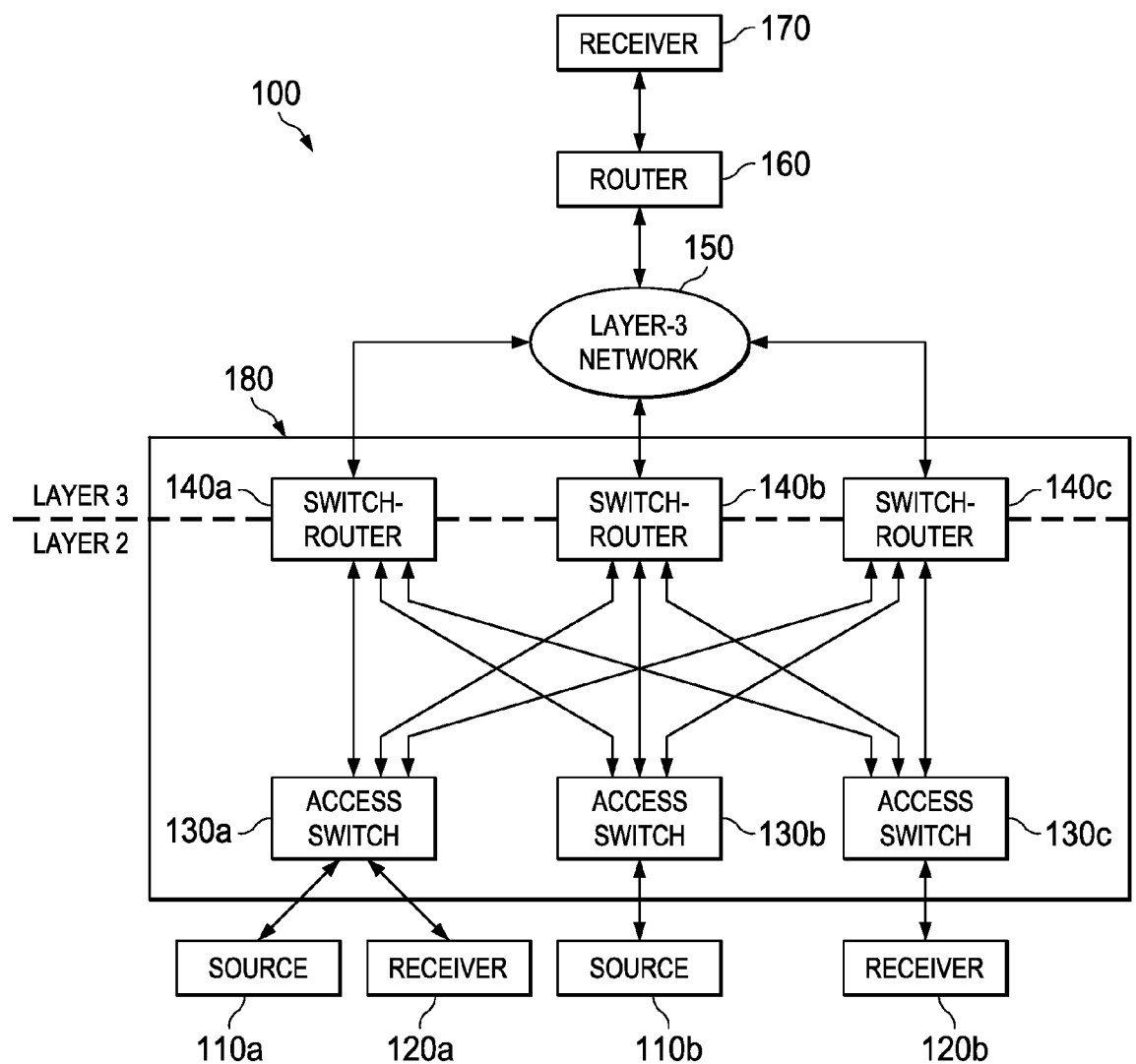
FIG. 1 is a simplified block diagram of an example system for multicast multipathing in a Layer-2 network in accordance with one embodiment of the present disclosure.

FIG. 1 illustrates an example system 100 for Layer-2 multicast multipathing in accordance with one embodiment of the present disclosure. System 100 includes a number data sources 110, data receivers 120, access switches 130, and switch-routers 140. Data sources 110 may be any logical devices for presenting, storing, and/or processing data. For example, data sources 110 may be personal computers, laptops, servers, mobile devices, and/or tablet computers. In certain implementations, one or more of data sources 110 may be virtual machines. Data sources 110 typically need to communicate data to other logical devices and, thus, are coupled to one or more communication networks. Data sources 110 may be in the same or different virtual local area networks (VLANs). Data sources 110 may also receive data. Thus, they are only labeled as data sources for the ease of discussion.

Similarly, data receivers 120 may be any logical devices for presenting, storing, and/or processing data. For example, data receivers 120 may be personal computers, laptops, servers, mobile devices, and/or tablet computers. Data receivers 120 typically need to receive data from other logical devices and, thus, are coupled to one or more communication networks. In certain implementations, one or more of data receivers 120 may be virtual machines. Data receivers 120 may be in the same VLAN as one or more of data sources 110 or in different VLANs. Data receivers 110 may also source data. Thus, they are only labeled as data receivers for the ease of discussion.

Access switches 130 and switch-routers 140 are communicatively coupled to data sources 110 and data receivers 120 and provide switching and routing between them. Access switches 130 and switch-routers 140 together can form a Layer-2 network 180. In particular implementations, network 180 may be a Layer-2 multipath network (e.g., a Fabricpath network). Access switches 130 and switch-routers 140 may use a forwarding paradigm that provides Layer-2 multipathing capability. Access switches 130 and switch-routers 140 may also provide the ability to scale Layer-2 networks to a large number of switches and/or routers (e.g., Fabricpath).

A Fabricpath network may, for example, be part of an enterprise network or a data center, which could, for example, also include a number of servers, databases, and/or other devices for storing and/or processing data. A data center could also include more communication networks. A communication network is typically a series of points or nodes of interconnected communication paths for receiving and transmitting messages. As used herein, the term "network node" is meant to encompass switches, routers, proxys, gateways, bridges, load balancers, firewalls, inline service nodes, proxies, servers, processors, modules, or any other suitable device, component, element, or object operable to exchange information in a network environment. A network node may include any suitable hardware, software, components, modules, interfaces, or objects that facilitate the operations thereof. This may be inclusive of appropriate algorithms and communication protocols that allow for the effective exchange (reception and/or transmission) of data or information.

A data center's communication network(s) may offer a communicative interface between network elements (e.g., switches, bridges, gateways, etc.) and may be any IP network, local area network (LAN), virtual LAN (VLAN), wireless LAN (WLAN), metropolitan area network (MAN), wide area network (WAN), extranet, Intranet, virtual private network (VPN), or any other appropriate architecture or system that facilitates communications in a network environment. The networks can support a transmission control protocol (TCP)/IP, or a user datagram protocol (UDP)/IP in particular embodiments of the present disclosure; however, these networks may alternatively implement any other suitable communication protocol for transmitting and receiving data packets within system 100.

Access switches 130 and switch-routers 140 may use a link state routing (e.g., intermediate system to intermediate system (IS-IS) or Fabric Shortest Path First (FSPF)) for forwarding purposes, whereas classic Ethernet networks commonly use a spanning tree protocol (STP) as their forwarding protocol. Link state protocols generally work at the Layer-2 broadcast domain. Link state routing is a protocol that allows a node in a network to determine network topology by sharing information about a transmission cost to each of its neighboring nodes. Link state routing messages are transmitted to and received from neighbors. The least expensive path to various destinations can be determined using the link state information.

Link state information can be used to generate network topology information at various network nodes for creating forwarding tables. The forwarding tables allow network nodes (such as switches, bridges, and routers) to forward the received traffic on an appropriate output interface. In order to generate a network topology map and a forwarding table at a specific network node, link state information is distributed from various network nodes. Each network node is configured to create a link state message having information about the distance, delay, or cost to each of its neighbors. A link state record (LSR) can then be transmitted to neighboring nodes.

Addressing and forwarding can include the use of a locally assigned aggregatable (or hierarchical) Media Access Control (MAC) address for forwarding activities. A link state protocol can be used to determine the forwarding topology and, further, to support shortest path and equal cost multi-path forwarding for unicast traffic. Multicast frames can also readily use multipathing, albeit using a slightly different scheme. Additionally, a single control protocol can be used to compute unicast paths and multi-destination (e.g., multicast or broadcast) trees. Broadcast techniques can be viewed as a special case of multicast, in which all nodes are interested in a message.

In the illustrated example, three access switches 130 are shown, but any number may be used in other implementations. Access switches 130 receive messages (e.g., packets) from data sources 110 and switch them to data receivers 120, assuming they are in the same VLAN, and switch-routers 140. Access switches 130 may also receive messages from switch-routers 140 (e.g., from data sources outside network or from data sources in different VLANs) and switch them to data receivers 120.

Switch-routers 140 provide a gateway between the Layer-2 network and a Layer-3 network 150. Switch-routers 140 forward (or cooperate with each other in order to forward) messages (e.g., packets) in a network environment by switching and routing messages. Switch-routers 140 may be integrated switch-routers, switches that have routing capability, or routers that have switching capability. Switch-routers 140 may use a protocol such as Protocol-Independent Multicast (PIM) for forwarding multicast messages. PIM is a family of multicast routing protocols for Internet Protocol (IP) networks that provide one-to-many and many-to-many distribution of data over a LAN, a WAN, or the Internet. It is termed protocol-independent because it does not include its own topology discovery mechanism, instead relying on routing information supplied by other routing protocols, such as Routing Information Protocol, Open Shortest Path First, Borderer Gateway Protocol, and Multicast Source Discovery Protocol. For control plane interactions, a protocol such as Fabricpath IS-IS may be used as the underlying transport mechanism.

Layer-3 network 150 may be any appropriate type of communication network that uses Layer-3 protocols. Network 150 may, for example, include a number of switches, routers, bridges, repeaters, and/or other equipment for conveying information. Network 150 may, for example, be a wide area network (WAN) or the Internet. In particular implementations, network 150 may interconnect data centers and be a data center interconnect (DCI). Layer-3 network 150 is also communicatively coupled with a router 160, which may, for example, be a switch-router. Router 160 is coupled to a data receiver 170. Data receiver 170 may be similar to data receivers 120, except that it is located across Layer-3 network 150 from data sources 110.

In certain modes of operation, access switches 130 and switch-routers 140 may use a common hash sequence for forwarding multicast messages. The hash sequence may, for example, be shared between access switches 130 and switch-routers 140 by using a sub-TLV (Type, Length, Value) in the IS-IS router-capability TLV. A hash may, for instance, be performed on a {VLAN, Source, Group} 3-tuple, where the source is the source of the multicast data and the group is the multicast group for which the source is sending data. This should, in most instances, provide a unique identifier for each 3-tuple. This identifier may then be used to retrieve a tree identifier (i.e., to determine which tree to forward on) and a tag for a designated router (i.e., one of switch-routers 140). Thus, the tree and the designated router may be linked. The tree identifier may, for example, be a forwarding tag (Ftag) in Fabricpath. This should result in a disjoint set of {VLAN, Source, Group} (the hash outcomes) being assigned to each tree and available router. An access switch 130 receiving a multicast message may then switch the message to any appropriate receivers 120 and to the appropriate one of switch-routers 140.

The tree identifier and the designated router associated with a {VLAN, Source, Group} 3-tuple may be determined by an access switch in a number of ways. For example, the tree identifier and designated router may be stored in an outgoing interface (OIF) list and be referenced by the hash value of the 3-tuple. The port that leads to the designated switch-router 140 may be made part of the OIF list. Thus, the access switch can determine which ports to forward messages on. The receiving switch-router 140 may also be aware of the hash and use it to determine the groups for which it will perform Layer-3 multicast forwarding. The receiving switch-router 140 may also determine destination interfaces (e.g., ports) based on the hash. It may, for example, examine an OIF list.

Note that it is possible to run designated routers in active/standby mode. Two designated routers that are in active/standby mode may have the same index in an ordered list of designated routers, therefore allowing both to receive the same traffic. In addition, this implies that PIM on these routers is aware of the fact that it can be the designated router at a {VLAN, Source, Group} granularity.

A message may, for example, need to be routed to one of receivers 120 if it is in a different VLAN than the data source 110. Additionally, a message may need to be routed into Layer-3 network 150 if the message is destined for a data receiver that is not part of the Layer-2 network (e.g., data receiver 170).

To establish multicast operations, access switches 130 may detect that a data receiver 120 wants to join a multicast group. Access switches 130 may, for example, accomplish this using Internet Group Management Protocol (IGMP) snooping (or by using any other appropriate protocol). When a data receiver 120 desiring to receive data for a new group is first detected by one of access switches 130, the access switch will compute the {VLAN, Source, Group} hash and choose a tree identifier (e.g., an Ftag) and one of switch-routers 140 as the designated router.

Existing hardware may pick the tree identifier using the {VLAN, Source, Group} 3-tuple. A tree identifier may, for example, be selected based on the root of the tree, for which it is typically beneficial to be near the source. The tree identifier does not need to form part of the key for the forwarding lookup, however. It may be used for Incoming Interface Check (IIC) and Color Blocking Logic (CBL) based tree enforcement. Note that the hardware result for a {VLAN, Source, Group} lookup can be programmed with the ports for the tree identifier resulting from the ({VLAN, Source, Group} hash. This can mean that the entries for the other tree identifiers do not need to be programmed or computed.

For hardware in which the forwarding to router ports and to the receivers is done using an (effectively) single lookup, software may build an OIF list that is the union of the links to reach the appropriate data receivers and the link to reach the designated router. However, since the access switch is pinning a group to a router, only the port that leads to that switch-router needs to be part of the OIF list (in addition to the ports that lead to data receivers 120).

For other hardware, a two-step lookup may be used. First, the {VLAN, Source, Group} hash may be implemented, which may provide the OIF list consisting of the data receivers as well as a router_tag. Then, a {VLAN, Router_tag} lookup may be performed that provides the list of router ports. The router_tag may, for example, be: 1) an indirection to the designated switch-router for that {VLAN, Source, Group}; 2) an indirection to the list of available routers, which may happen during router addition or removal; or 3) an indirection to a set of routers that have been setup in active/standby mode.

Hardware can also be enhanced to provide the tree identifier as a result of the forwarding {VLAN, Source, Group} lookup (in addition to the router_tag and the OIF list). This can be used in situations where the hash results in a poor choice of tree identifiers, which may be configuration driven. The designated router may, for example, be selected by performing a modulo operation on the hash value against the tree identifier. In certain implementations, the distance of the designated router from the root of the tree may also be considered, closer designated routers typically being more preferred. The join request may be sent to the designated router, which may build the forwarding tree for the group. Additionally, the rest of the network may be informed of the join request. For example, in a Fabricpath network, the IS-IS protocol on an access will advertise to the rest of the network that it has received a join request for the {VLAN, Group} set in its link state protocol data unit (PDU) packets.

When one of access switches 130 learns of removal of a designated switch-router 140, the access switch may briefly change the router_tag for that designated switch-router to point to the ports leading to other available switch-routers 140. Then, the multicast groups that had been assigned to the removed switch-router need to be reassigned to the remaining switch-routers 140. Thus, the mapping of the hash outcome to the designated router should be updated (e.g., redistributed among the rest of the designated routers).

For example, the modulo operation performed on the hash value against the tree identifier may be adjusted to account for the fewer number of routers, and this may be used to reassign the groups. For instance, the designated routers may be sorted by their MAC address into a list [router 0, . . . , router X−1], and the HASH value output may be processed by MOD by X, the number of routers. This may not always provide the most optimal forwarding through the network, but if PIM and Layer-2 agree, it should be functional. In certain implementations, the distance of the designated router from the root of the Layer-2 multicast tree may also be considered, closer designated routers typically being more preferred. Thus, the designated router(s) closest to the root of the Layer-2 multicast tree may be associated with tree (e.g., the same hash values that choose tree X may choose the designated router nearest to the root of that tree), which may provide enhanced forwarding.

As another example, the access switches may know how many switch-routers 140 are available, and the highest source Media Access Control (MAC) address may take the first tree number. Switches in a Layer-2 network may, for example, use the receipt of a PIM hello packet to detect the presence of a router in the network. After a settling time, the groups that were previously assigned to the removed designated switch-router can then be reassigned to the remaining router-tags. The redistribution algorithm may be used by the access switches and the switch-routers so that hash values are tied to designated routers.

When a new designated switch-router is available, the learned groups are redistributed among the new list of designated switch-routers. Thus, a new designated router joining the network would take some subset of values from each of the already present designated routers such that the hash outcomes are evenly distributed among the new set of routers, which should result in the mapping of the hash outcomes to the designated routers being updated (e.g., redistributed among the designated routers).

For example, the modulo operation performed on the hash value against the tree identifier may be adjusted to account for the larger number of routers, and this may be used to reassign the groups. In certain implementations, the distance of the designated router from the root of the tree may also be considered, closer designated routers typically being more preferred. The Layer-2 forwarding protocol and the PIM may interact to determine the router location with respect to the tree root. Thus, the designated router(s) closest to the root of the Layer-2 multicast tree may be associated with tree (e.g., the same hash values that choose tree X will choose the designated router nearest to the root of that tree), which will provide enhanced forwarding. As another example, the access switches may know how many switch-routers 140 are available, and the highest source Media Access Control (MAC) address may take the first tree number. Switches in a Layer-2 network may, for example, use the receipt of a PIM hello packet to detect the presence of a router in the network. After a settling time, the groups that were previously assigned to the removed designated switch-router can then be reassigned to the remaining router-tags. The redistribution algorithm may be used by the access switches and the switch-routers so that hash values are tied to designated routers.

To redistribute the groups, there may be a communication between PIM and the Layer-2 forwarding protocol (e.g., FabricPath) to assign the designated router to a tree identifier. The tree identifier that a group is assigned to provides the designated router also. A change in the router_tag may be preceded by a settling period where the traffic is sent to all the available routers. In the network transition situations discussed above, it is possible that more than one switch-router 140 receives messages for a given {VLAN, Source, Group} set. The PIM's assert mechanism may be used by the switch-routers before they begin forwarding to establish designated switch-router ownership for those {VLAN, Source, Group} sets. This may prevent duplicates.

The discussed scheme may need modifications from PIM for operation in cases in which in the Layer-2 network there are: a) multiple sources, but no receivers; and b) there are multiple sources, but the receivers only issue (*, g) joins. Basically, the Layer-2 network in these cases would be unaware of the various transmitting sources and/or receivers. For both cases, since the Layer-2 network is unaware of the complete {VLA, Source, Group} information and is therefore unable to compute the complete hash, forwarding would happen towards available switch-routers. In this case, access switches 130 may compute paths for the trees for each {VLAN, Group} combo.

However, PIM can receive the initial data message when the source sends data. Therefore, this problem can be solved if the PIM-designated router creates an IGMP-like {VLAN, Group, Source} state in the Layer-2 multipath network, possibly by redistribution to IS-IS. When this happens, hardware no longer finds the optimized multicast forwarding (OMF) entry (which is a list of outgoing interfaces going to multiple routers) or the generic (*, Group) entry. Instead, it finds the specific {VLAN, Source, Group} OIF list, which will point towards a specific router.

Certain embodiments of system 100 can offer any number of significant features. For example, the architecture can improve scalability as the number of multicast trees grows. Currently, an increasing number of trees would lead to greater processing needs in software and greater storage needs in hardware. For example, for N {S,G} groups, M*N entries need to be computed and installed in the hardware, where M is number of trees. Installation of all these entries may be important because the same group's multicast message can travel on any of the M trees, based on what hash/tree identifier was chosen at the ingress. Thus, an OIF list should be used for each tree. However, in system 100, the scalability problem is addressed because it only needs to compute and program entries for a single tree identifier for that group since each {VLAN, Source, Group} should hash to the same entry.

Additionally, while there may exist more than one router on a VLAN, only a single one gets picked as the designated router for forwarding multicast packets on that VLAN for a group. (There may be multiple routers on a VLAN configured such that they are each a designated router for a disjoint set of groups.) However, switches in a Layer-2 network use the receipt of a PIM Hello packet to detect the presence of a router in the network. Therefore, at the Layer-2 network level, switches are not aware of the designated router election, and they consider all routers on a VLAN to be active. The Layer-2 network forwards all multicast traffic to the router(s) in addition to receivers attached to the Layer-2 network. Thus, since the designated election is not visible to the switches, the multicast traffic gets channeled to all the routers on that network, regardless of whether they are the designated router or not. This is not only suboptimal, but also does not utilize the additional opportunity for load balancing and fault-tolerance that exists in a Layer-2 multipath (e.g., Fabricpath) network. In system 100, however, the multicast traffic is directed to the appropriate switch-router. Moreover, the traffic is spread out over the available switch-routers, thereby making optimal usage of them.

Furthermore, the links may be used in a more optimal manner. Existing schemes lead to sub-optimal usage of links in typical access-spine fat-tree type networks. This mechanism of load balancing also leads to better link-utilization in typical fat-tree networks. Thus, system 100 provides a better multi-pathing solution for multi-destination traffic.

Although FIG. 1 illustrates one example of a system for Layer-2 multicast multipathing, other systems for Layer-2 multicast multipathing may include fewer, additional, and/or a different arrangement of components. For example, one or more data sources may be located outside of Layer-2 network 180. The data sources may send multicast data through Layer-3 network 150 to one or more of switch-routers 140. The switch-routers 140 may then route the multicast traffic to the appropriate switches 130, which may switch the traffic to the appropriate data receivers 120. In some implementations, however, Layer-3 network 150 may not exist. As another example, access switches 130 may be switch-routers.

As another example, local area networks may exist between the end nodes (e.g., data sources 110 and data receivers 120) and access switches 130. The local area networks may allow the end nodes to communicate messages with access switches 130. The local area networks may, for example, be conventional Ethernet networks. In the illustrated example, data source 110a and data receiver 110b may both be coupled to a local area network even though they are in different virtual LANs (VLANs), and data receiver 120b may be coupled to another local area network even though data receiver 120b is part of the same VLAN as data source 110a. In certain implementations, local area networks, access switches, and switch-routers 140 may operate at Layer-2 and form a Layer-2 network. In these situations, each local area network and the network formed by access switches and switch routers-140 may, however, have their own Layer-2 domain.

As discussed, system 100 is designed for switch-routers 140 to be co-located Layer-3 (e.g., PIM) routers and Layer-2 (e.g., L2MP) switches. In order for the same scheme to work in a network where Layer-3 entities are separate from the Layer-2 entities, additional functionality may be provisioned in the routers (e.g., to establish the designated router based on {VLAN, Group, Source} granularity rather than per-VLAN per group) and also extra signaling to extend the tree identifier and {VLAN, Group, Source} pinning into the routers.

Figure 2:
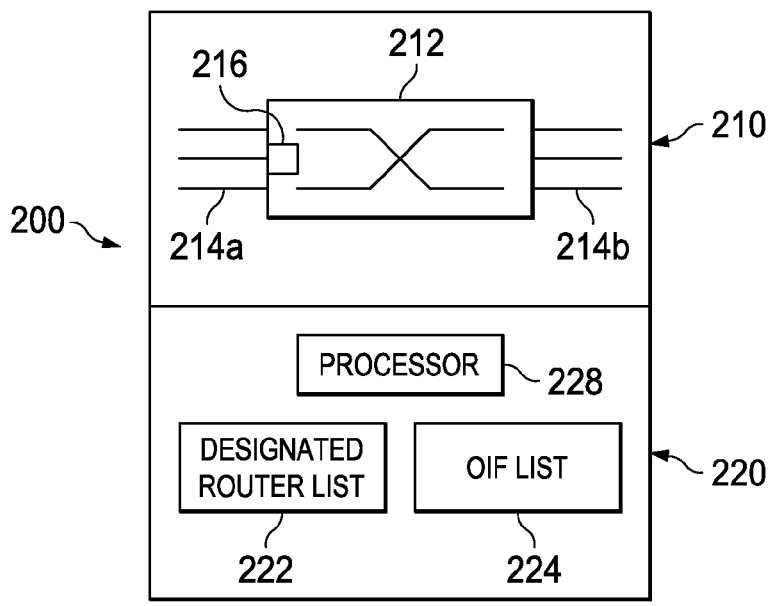
FIG. 2 is a simplified block diagram of an access switch for multicast multipathing in a Layer-2 network in accordance with one embodiment of the present disclosure.

FIG. 2 illustrates an example access switch 200, which is a type of network node that could, for example, be used in system 100. Access switch 200 includes a data plane 210 and a control plane 220. In data plane 210, access switch 200 includes switching logic 212 connected between two sets of ports 214a and 214b. Switching logic 212 is configured to route or internally switch traffic received on one port set 214a (ingress ports) to another port set 214b (egress ports). Data plane 210 also includes a processor 216 (e.g., an application specific integrated circuit (ASIC)) to perform enhanced operations. Control plane 220 includes a generic or application-specific processor 228 for implementing the switching functionality and any channel protocols. In particular implementations, processor 228 may be implemented in a state machine, a micro-controller, hardware, firmware, programmable logic, or a combination thereof.

Also included in access switch 200 are a designated router list 222 and an OIF list 224. Designated router list 222 may store a list of available designated routers and be constructed based on registration messages received from designated routers. Switches in a Layer-2 network may, for example, use the receipt of a PIM Hello packet to detect the presence of a router in the network. OIF list 224 may, for example, be built as access switch 200 receives group join requests from its local data sources.

In certain modes of operation, access switch 200 may use a hash sequence that is shared in common with routers and other access switches for forwarding multicast messages. In certain implementations, the hash may be computed by processor 216. The hash sequence may, for example, be shared between access switches and routers by using IS-IS TLVs. A hash may, for instance, be performed on a {VLAN, Source, Group} 3-tuple. This identifier may then be used to retrieve a tree identifier (i.e., to determine which tree to forward on) and a designated router. The tree identifier may, for example, be a forwarding tag (Ftag) in Fabricpath. Thus, the tree and the designated router may be linked. When access switch 200 receives a multicast message, the access switch may then switch the message to any appropriate data receivers and to the appropriate designated router.

The tree identifier and the designated router associated with a {VLAN, Source, Group} 3-tuple may be determined by an access switch in a number of ways. For example, the tree identifier and designated router may be stored in OIF list 224 and be referenced by the hash value of the 3-tuple. The port that leads to the designated router may be made part of the OIF list. Thus, the access switch can determine which ports to forward messages on.

To establish multicast operations, access switch 200 may detect that an associated data receiver wants to join a multicast group. Access switch 200 may, for example, accomplish this using IGMP snooping. When a data receiver desiring to receive data for a group is first detected by access switch 200, the access switch may compute the {VLAN, Source, Group} hash and choose a tree identifier (e.g., an Ftag) and a router from designated router list 222 as the designated router. The join request may be sent to the designated router, which may build the forwarding tree for the group.

Access switch 200 may pick the tree identifier using the {VLAN, Source, Group} 3-tuple. The tree identifier does not need to form part of the key for the forwarding lookup, however. It may be used for IIC and CBL based tree enforcement. Processor 228 may build OIF list 224 and load it into switch fabric 212, where it may be accessed by processor 216 For hardware in which the forwarding to router ports and to the receivers is done using an (effectively) single lookup, software may build an OIF list that is the union of the links to reach the data receivers and the link to reach the designated router.

Note that the hardware result for a {VLAN, Source, Group} lookup can be programmed with the ports for the tree identifier resulting from the {VLAN, Source, Group} hash. This can mean that the entries for the other tree identifiers do not need to be programmed or computed.

For hardware in which the forwarding to router port and to the receivers is done using an (effectively) single lookup, software may build an OIF list that is the union of the links to reach the data receivers and the links to reach the designated router. However, since the access switch is pinning a group to a router, the port that leads to that switch-router should be part of the OIF list (in addition to the ports that lead to the data receivers).

For other hardware, a two-step lookup may be used. First, the {VLAN, Source, Group} hash may be implemented, which may provide the OIF list consisting of the data receivers as well as the router_tag. Then, a {VLAN, Router_tag} lookup may be performed that provides the list of router ports. The router_tag may, for example, be: 1) an indirection to the designated switch-router for that {VLAN, Source, Group}; 2) an indirection to the list of available routers, which may happen during router insertion or removal; or 3) an indirection to a set of routers that have been setup in active/standby mode.

Hardware can also be enhanced to provide the tree identifier as a result of the forwarding {VLAN, Source, Group} lookup (in addition to the router_tag and the OIF list). This can be used in situations where the hash results in a poor choice of tree identifiers, which may be configuration driven.

When access switch 200 learns of removal of a designated router, the access switch may briefly change the router_tag for that designated router to point to ports leading to other available designated routers. Then, the groups that had been assigned to that router may be reassigned to the remaining routers. The access switch may, for example, know how many routers are available, and the highest source Media Access Control (MAC) address may take the first tree number. In other implementations, the router_tags may be redistributed in a balanced manner (e.g., using a Modulo operation) and/or by taking into account the distance of a designated router from a tree root. After a settling time, the groups that were previously assigned to the removed designated router can then be reassigned to the remaining router-tags.

When an additional designated router is available, the learned groups are redistributed among the updated list of designated switch-routers. In certain implementations, the router_tags may be redistributed in a balanced manner (e.g., using a Modulo operation) and/or by taking into account the distance of a designated router from a tree root. A change in the router_tag may be preceded by a settling period where the traffic is sent to all the available routers.

The discussed scheme may need modifications from PIM for optimal operation for cases in which in the Layer-2 network there are: a) multiple sources, but no receivers; and b) there are multiple sources, but the receivers only issue (*, g) joins. Basically, the Layer-2 network in these cases would be unaware of the various transmitting sources and/or receivers. For both cases, since the Layer-2 network is unaware of the complete {VLAN, Source, Group} information and is therefore unable to compute the complete hash, forwarding would happen towards all available routers. However, PIM receives the initial data message when the source sends data. Therefore, this problem can be solved if the PIM-designated router creates an IGMP-like {VLAN, Group, Source} state in the Layer-2 multipath network, possibly by redistribution to IS-IS. When this happens, hardware no longer finds the OMF entry (which goes to all routers) or the generic (*, Group) entry. Instead, it finds the specific {VLAN, Source, Group} OIF list, which will point towards a specific router.

Figure 3:
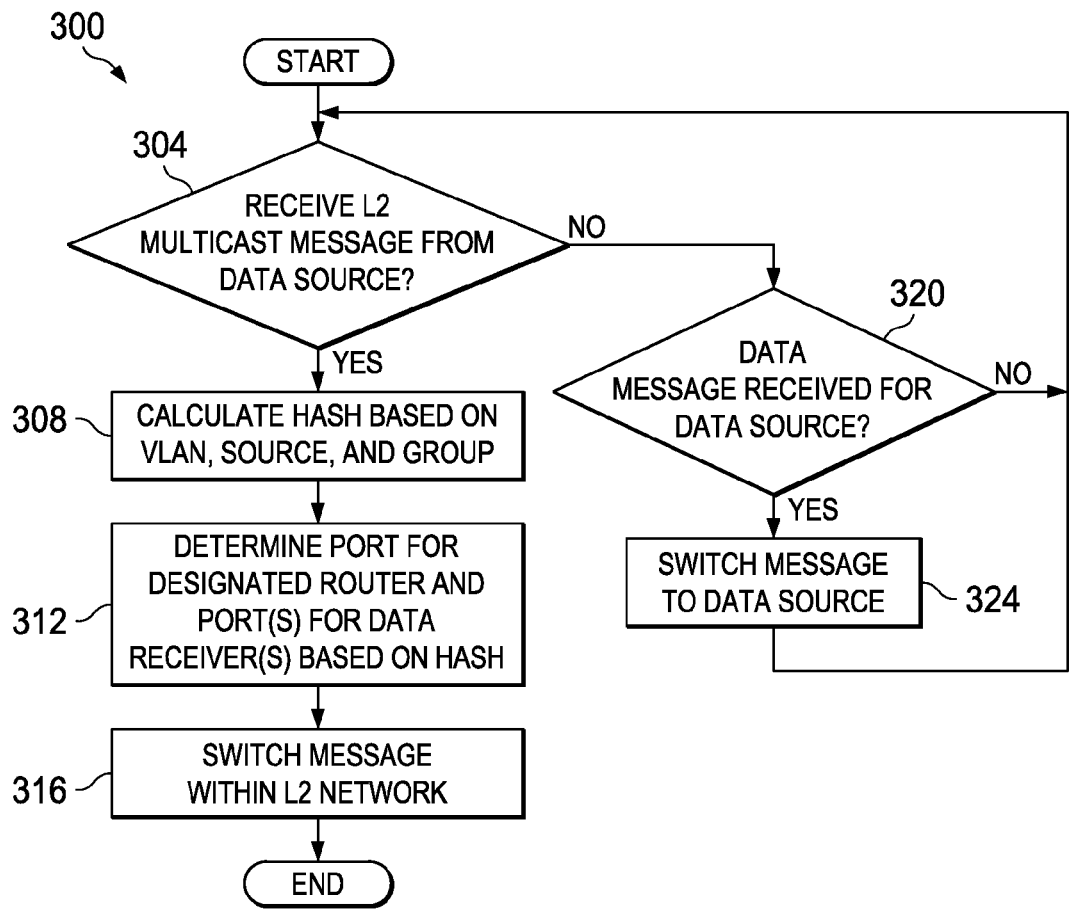
FIG. 3 is a simplified flow diagram of an example process for multicast multipathing in a Layer-2 network in accordance with one embodiment of the present disclosure.

FIG. 3 illustrates an example flow diagram 300 for Layer-2 multicast multipathing. The activities illustrated in FIG. 3 may, for example, be implemented by an access switch 130. If a multicast message has been received, then a hash operation is performed on the VLAN, the source, and the multicast group associated with the message (operation 308). The flow can also include determining a port for a designated router and port(s) for one or more data receivers based on the hash result (operation 312). Determining the router port and one or more data receiver port(s) may, for example, be accomplished by using the hash result as an index into an OIF list. The flow further calls for switching the message within the Layer-2 network (operation 316) using the determined ports.

If a Layer-2 multicast message has not been received, the flow can include determining whether a data message has been received from a data source (operation 320). A data message may, for example, be received for a data source if the data source is also a data receiver. If a data message has not been received for a data source, then a check is made whether a Layer-2 multicast message has been received from the data source (operation 304). If a data message has been received for a data source, the flow includes switching the message to the data source (operation 324). The flow can also include checking whether a Layer-2 multicast message has been received from the data source (operation 304). The flow activities may be performed many times during the operation of a system for Layer-2 multicast messaging. In certain implementations, the flow may be performed continually.

Although FIG. 3 illustrates one process for Layer-2 multicast multipathing, other processes for Layer-2 multicast multipathing may include fewer, additional, and/or a different arrangement of operations. For example, a process may not include determining whether a data message has been received for the data source. As another example, a process may include handling group join requests from data receivers. As a further example, a process may include handling a change in designated routers (e.g., removal or addition). As an additional example, an access switch may not have to switch a multicast message to a data receiver (e.g., because they are on different VLANs or the data receiver is not in the Layer-2 network).

Figure 4:
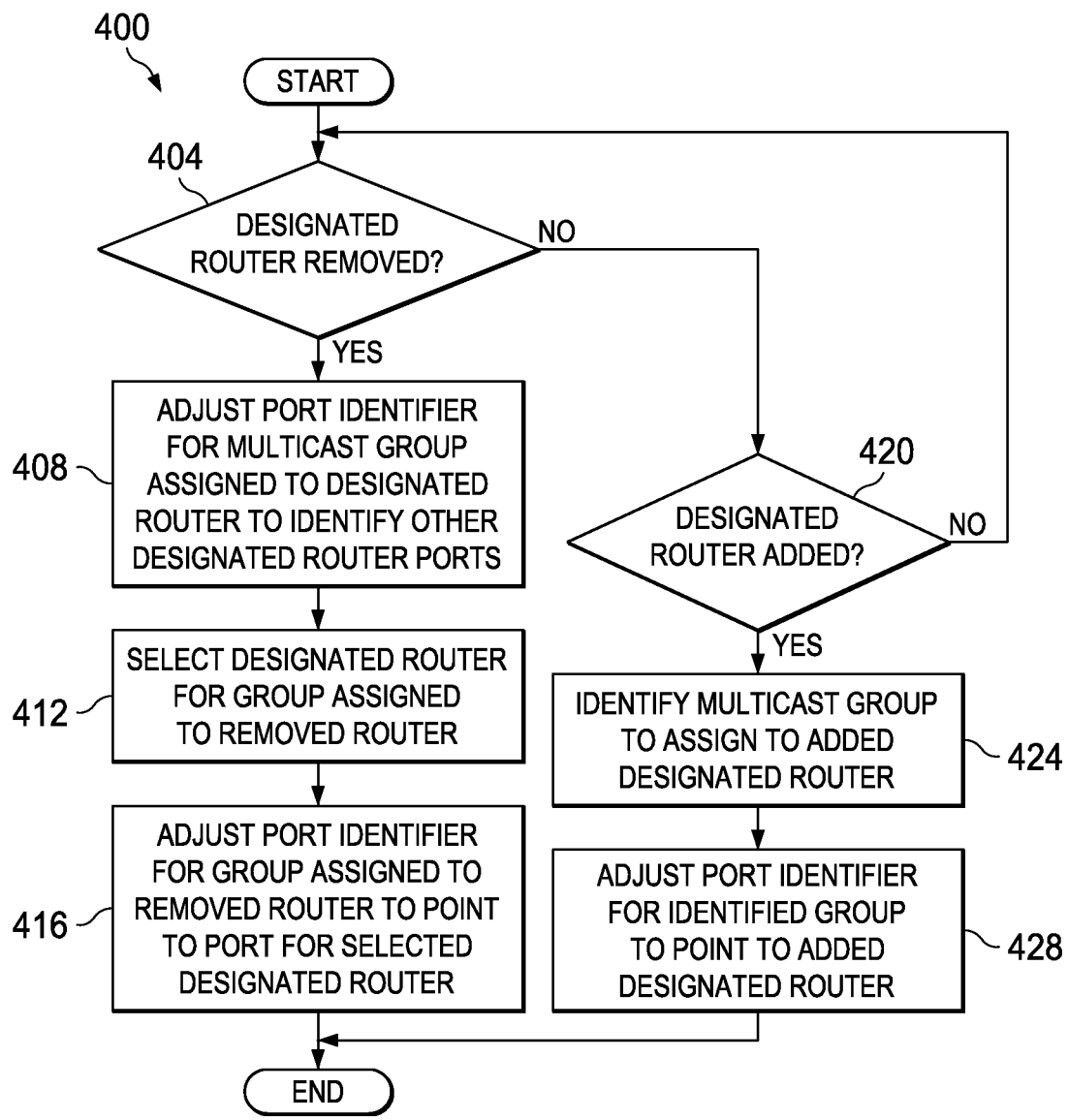
FIG. 4 is a simplified flow diagram illustrating another example process for multicast multipathing in a Layer-2 network in accordance with one embodiment of the present disclosure.

FIG. 4 illustrates an example flow diagram 400 for Layer-2 multicast multipathing. The flow may be, for example, implemented by an access switch 130. The flow can also include determining whether a designated router (e.g., a switch router) has been removed from the Layer-2 network (operation 404). Determining whether a designated router has been removed may, for example, be accomplished by a reachability test. If a designated router has been removed, the flow includes adjusting the designated router port identifier for a multicast group assigned to the designated router so that the port identifier points to ports for other designated routers (operation 408). For example, the port identifier may be adjusted so that it points to all of the other designated router ports.

The flow can also include selecting a designated router for the multicast group assigned to the removed designated router (operation 412). Selecting a designated router may, for example, be accomplished by redistributing them in a balanced manner (e.g., using a Modulo operation on the hashed tuple) and/or by taking into account the distance of a designated router from a tree root. Then, the group that had been assigned to the removed router may be reassigned to a remaining router. The flow further calls for adjusting the ports identifier for the multicast group assigned to the removed router to point to the port for the selected router.

Returning to operation 404, if a designated router has not been removed, the flow calls for determining whether a designated router has been added to the Layer-2 network (operation 420). If a designated router has not been added, the flow calls for again checking whether a designated router has been removed (operation 404). If, however, designated router has been added, the flow calls for identifying a multicast group to assign to the added designated router (operation 424). Identifying a multicast group to assign to the added designated router may, for example, be accomplished by load sharing using the network hashing algorithm. In certain implementations, the router_tag may be redistributed using a Modulo operation and/or by taking into account the distance of a designated router from a tree root.

The flow can include adjusting the port identifier for the identified multicast group to point to the port for the added designated router (operation 428). Adjusting the port identifier for the identified multicast group to point to the added designated router may, for example, be accomplished by changing a port identifier in an OIF list. The flow may be performed many times during the operation of a system for Layer-2 multicast messaging. In certain implementations, the flow of FIG. 4 may be performed continually.

Although FIG. 4 illustrates one process for Layer-2 multicast multipathing, other processes for Layer-2 multicast multipathing may include fewer, additional, and/or a different arrangement of operations. For example, a process may not include determining whether a designated router has been removed. As another example, a process may not include determining whether a designated router has been added. As an additional example, a process may include a settling time (e.g., in which router traffic is sent to all routers) before adjusting router tags for groups after a router event (addition or removal).

Note that in certain example implementations, the switching/routing functions outlined herein may be implemented by logic encoded in one or more non-transitory tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the switching/routing operations described herein. This includes the memory element being able to store software, logic, code, or processor instructions that can be executed to carry out the activities described in this Specification. A processor can execute any type of instructions associated with the data to achieve the switching/routing operations detailed herein in this Specification. In one example, the processor could transform an element or an article (e.g., data) from one state or thing to another state or thing.

In another example, the switching/routing activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that the communication systems are readily scalable and can accommodate a large number of clouds, networks, and/or switches, as well as more complicated/sophisticated arrangements and configurations. Accordingly, the examples provided herein should not limit the scope or inhibit the broad teachings of the specification as potentially applied to a myriad of other architectures.

FIG. 5 illustrates an example computer system 500 for routing in a Layer-2 network. Computer system 500 may, for example, illustrate some of the components of the control plane of a switch/router. System 500 includes a processor 510, an input/output system 520, and a memory 530, which can be coupled together by a network 540 (e.g., an internal framework that facilitates single, or bidirectional communications between these components). Alternatively, these elements can be suitable linked (or interact) in any other appropriate fashion. Processor 510 can include a logical processing unit (e.g., an arithmetic logic unit) that processes data under the direction of program instructions (e.g., from software). For example, processor 510 may be a microprocessor, a microcontroller, or an application specific integrated circuit. The processor may operate by reduced instruction set computer (RISC) or complex instruction set computer (CISC) principles. In general, the processor may be any device that manipulates data in a logical manner.

Input/output system 520 may include one or more communication interfaces and/or one or more user interfaces. A communication interface may, for instance, be a network interface card (whether wireless or wireless), a modem, or a bus interface. A user interface could, for instance, be a user input device (e.g., a keyboard, a keypad, a touchpad, a mouse, a stylus, or a microphone) or a user output device (e.g., a monitor, a display, or a speaker). In general, system 520 may be any combination of devices by which a computer system can receive and output data.

Memory 530 may, for example, include random access memory (RAM), read-only memory (ROM), flash memory, and/or disc memory. Various items may be stored in different portions of the memory at various times. Memory 530, in general, may be any combination of devices for storing data.

Memory 530 includes instructions 532 and data 536. Instructions 532 include an operating system 533 (e.g., Windows, Linux, or Unix) and applications 534, which include a switching manager 535. Data 536 includes the data required for and/or produced by applications 534, including a designated router list 537 and an Outgoing Interface (OIF) list 538. Network 540 can be responsible for communicating data between processor 510, input/output system 520, and memory 530. Network 540 may, for example, include a number of different types of busses (e.g., serial and parallel) that are somewhat internal to a given device.

In certain modes of operation, computer system 500, according to switching manager 535, use a hash sequence shared in common in a Layer-2 network for forwarding multicast messages. A hash may, for instance, be performed on a {VLAN, Source, Group} 3-tuple. This should, in most instances, provide a unique identifier for each 3-tuple. This identifier may then be used to retrieve a tree identifier (i.e., to determine which tree to forward on) and a designated router (i.e., for a switch-router in the Layer-2 network). The tree identifier may, for example, be a forwarding tag (Ftag) in Fabricpath. Thus, the tree and the designated router may be linked.

The tree identifier and the designated router associated with a {VLAN, Source, Group} 3-tuple may be determined by an access switch in a number of ways. For example, the tree identifier and designated router may be stored in OIF list 538 and be referenced by the hash value of the 3-tuple. The port that leads to the designated switch-router may be made part of the OIF list. Thus, the access switch can determine which ports to forward messages on.

To establish multicast operations, computer system 500 may detect that a data receiver wants to join a multicast group (e.g., by using IGMP snooping). When a data receiver desiring to receive data for a new group is first detected, computer system 500 may compute the {VLAN, Source, Group} hash and choose a tree identifier (e.g., an Ftag) and a designated router from designated router list 537. The join request may be sent to the designated router, which may build the forwarding tree for the group. Additionally, the rest of the Layer-2 network may be informed of the join request.

For hardware in which the forwarding to router ports and to the receivers is done using an (effectively) single lookup, computer system 500 may build an OIF list that is the union of the links to reach the appropriate data receivers and the link to reach the designated router. However, since a group is being pinned to a router, the port that leads to that router should be part of OIF list 538 (in addition to the ports that lead to data receivers 120).

For other hardware, a two-step lookup may be used. First, computer system 500 may implement the {VLAN, Source, Group} hash, which may provide the OIF list portion consisting of the data receivers as well as a router_tag. Then, a {VLAN, Router_tag} lookup may be performed that provides the list of router ports. The router_tag may, for example, be: 1) an indirection to the designated switch-router for that {VLAN, Source, Group}; 2) an indirection to the list of available routers, which may happen during router addition or removal; or 3) an indirection to a set of routers that have been setup in active/standby mode. Hardware can also be enhanced to provide the tree identifier as a result of the forwarding {VLAN, Source, Group} lookup (in addition to the router_tag and the OIF list). This can be used in situations where the hash results in a poor choice of tree identifiers, which may be configuration driven. The designated router may, for example, be selected by performing a modulo operation on the hash value against the tree identifier. In certain implementations, the distance of the designated router from the root of the tree may also be considered, closer designated routers typically being more preferred.

When computer system 500 learns of removal of a designated router, the processor may briefly change the router_tag for that designated router to point to ports leading to other available routers. Then, the multicast groups that had been assigned to the removed router need to be reassigned to the remaining routers. For example, computer system 500 may adjust the modulo operation performed on the hash value against the tree identifier to account for the fewer number of routers, and this may be used to reassign the groups. For instance, the designated routers may be sorted by their MAC address into a list [router 0, . . . , router X–1], and the hash value output may be processed by MOD by X, the number of routers. In certain implementations, the distance of the designated router from the root of the Layer-2 multicast tree may also be considered, closer designated routers typically being more preferred. Thus, the designated router(s) closest to the root of the Layer-2 multicast tree may be associated with tree (e.g., the same hash values that choose tree X may choose the designated router nearest to the root of that tree), which may provide enhanced forwarding. As another example, computer system 500 may determine how many designated routers are available, and the highest source MAC address may take the first tree number. Switches in a Layer-2 network may, for example, use the receipt of a PIM hello packet to detect the presence of a router in the network.

After a settling time, computer system 500 may assign the groups that were previously assigned to the removed designated router to the remaining router-tags. The redistribution algorithm may be used by computer system 500 and the designated routers so that hash values are tied to designated routers. When a new designated router is available, the multicast groups are redistributed among the revised designated router list. For example, computer system 500 may adjust the modulo operation performed on the hash value against the tree identifier to account for the larger number of routers, and this may be used to reassign the groups. In certain implementations, processor may also evaluate the distance of the designated router from the root of the tree, closer designated routers typically being more preferred. A Layer-2 forwarding protocol and the PIM may interact to determine the router location with respect to the tree root. Thus, the designated router(s) closest to the root of the Layer-2 multicast tree may be associated with tree (e.g., the same hash values that choose tree X will choose the designated router nearest to the root of that tree), which will provide enhanced forwarding.

As another example, computer system 500 may determine how many designated routers are available, and the highest source MAC address may take the first tree number. Switches in a Layer-2 network may, for example, use the receipt of a PIM hello packet to detect the presence of a router in the network. After a settling time, computer system 500 may reassign the groups that were previously assigned to the removed designated router to the remaining router-tags. The redistribution algorithm may be used by processor 510 and the designated routers so that hash values are tied to designated routers. Computer system 500 may, for example, accomplish these operations by implementing one or more parts of processes 300-400. Computer system 500 may also use any other techniques discussed herein.

It is also important to note that the operations discussed with reference to FIGS. 1-5 illustrate only some of the possible scenarios that may be executed by, or within, a communication system. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is allowable, however, in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, virtually any configuration that seeks to intelligently switch messages could readily adopt the teachings of the present disclosure.

Numerous other changes, substitutions, variations, alterations, and modifications may be ascertained to one skilled in the art, and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 25 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a multicast data message from a data source, the message being in a first virtual local area network and being associated with a multicast group;
calculating a hash value based on the virtual local area network, the data source, and the multicast group, wherein the hash value designates a unique combination of a forwarding tree on which the multicast data message is to be forwarded and a router of the forwarding tree;
determining a port for the router designated by the hash value in a Layer-2 network;
switching the multicast data message to the port that was determined; and
forwarding the multicast data message on the designated forwarding tree.

2. The method of claim 1, further comprising:
determining a port for a data receiver designated by the hash value in the Layer-2 network; and
switching the multicast data message to the port that was determined.

3. The method of claim 1, further comprising:
determining whether a designated router has been removed from the Layer-2 network; and
adjusting a port identifier for a multicast group assigned to the designated router to identify ports for other designated routers in the Layer-2 network.

4. The method of claim 3, further comprising:
selecting one of the other designated routers to be the designated router for the multicast group assigned to the removed router; and
adjusting the port identifier for the multicast group assigned to the removed router to point to a port for the selected one of the other designated routers.

5. The method of claim 1, further comprising:
identifying an added designated router that has been added to the Layer-2 network;
identifying a particular multicast group to assign to the added designated router; and
adjusting a port identifier for the particular multicast group to point to a port for the added designated router.

6. A network node, comprising:
a memory element configured for storing instructions; and
a processor coupled to the memory element and configured to execute the instructions such that the network node is configured to:
determine whether a multicast data message from a data source has been received, the message being in a first virtual local area network and being associated with a multicast group;
calculate a hash value based on the virtual local area network, the data source, and the multicast group, wherein the hash value designates a unique combination of a forwarding tree on which the multicast data message is to be forwarded and a router of the forwarding tree;
determine a port for the router designated by the hash value in a Layer-2 network;
switch the multicast data message to the port that was determined; and
forward the multicast data message on the designated forwarding tree.

7. The network node of claim 6, wherein the network node is further configured to:
  determine a port for a data receiver designated by the hash value in a Layer-2 network; and
  switch the multicast data message to the port that was determined.

8. The network node of claim 6, wherein the network node is further configured to:
  determine whether a designated router has been removed from the Layer-2 network; and
  adjust a port identifier for a multicast group assigned to the designated router to identify ports for other designated routers in the Layer-2 network.

9. The network node of claim 8, wherein the network node is further configured to:
  select one of the other designated routers to be the designated router for the multicast group assigned to the removed router; and
  adjust the port identifier for the multicast group assigned to the removed router to point to a port for the selected one of the other designated routers.

10. The network node of claim 6, wherein the network node is further configured to:
  identifying an added designated router that has been added to the Layer-2 network;
  identify a particular multicast group to assign to the added designated router; and
  adjust a port identifier for the particular multicast group to point to a port for the added designated router.

11. The network node of claim 6, wherein the network node is further configured to:
  construct an outgoing interface (OIF) list to be referenced by a particular hash value.

12. The network node of claim 11, wherein the OIF list is constructed based on group join requests from a plurality of data sources.

13. Logic encoded on one or more non-transitory tangible computer readable media for execution and when executed operable to:
  receive a multicast data message from a data source, the message being in a first virtual local area network and being associated with a multicast group;
  calculate a hash value based on the virtual local area network, the data source, and the multicast group, wherein the hash value designates a unique combination of a forwarding tree on which the multicast data message is to be forwarded and a router of the forwarding tree;
  determine a port for the router designated by the hash value in a Layer-2 network;
  switch the multicast data message to the port that was determined; and
  forward the multicast data message on the designated forwarding tree.

14. The logic of claim 13, wherein the logic is further operable to:
  determine a port for a data receiver designated by the hash value in a Layer-2 network; and
  switch the multicast data message to the port that was determined.

15. The logic of claim 13, wherein the logic is further operable to:
  determine whether a designated router has been removed from the Layer-2 network; and
  switch a port identifier for a multicast group assigned to the designated router to identify ports for other designated routers in the Layer-2 network.

16. The logic of claim 15, wherein the logic is further operable to:
  select one of the other designated routers to be the designated router for the multicast group assigned to the removed router; and
  adjust the port identifier for the multicast group assigned to the removed router to point to a port for the selected one of the other designated routers.

17. The logic of claim 13, wherein the logic is further operable to:
  identify an added designated router that has been added to the Layer-2 network;
  identify a particular multicast group to assign to the added designated router; and
  adjust a port identifier for the particular identified multicast group to point to a port for the added designated router.

18. The logic of claim 13, wherein the logic is further operable to:
  construct a designated router list, which identifies available designated routers in the Layer-2 network, wherein the router list is constructed based on registration messages received from a plurality of network nodes of the Layer-2 network.

19. The logic of claim 13, wherein the logic is further operable to:
  construct an outgoing interface (OIF) list to be referenced by a particular hash value, wherein the OIF list is constructed based on group join requests from a plurality of data sources.

* * * * *